No. 782,079. PATENTED FEB. 7, 1905.
T. W. STEELE.
NUT LOCK.
APPLICATION FILED AUG. 5, 1904.
Fig 1.
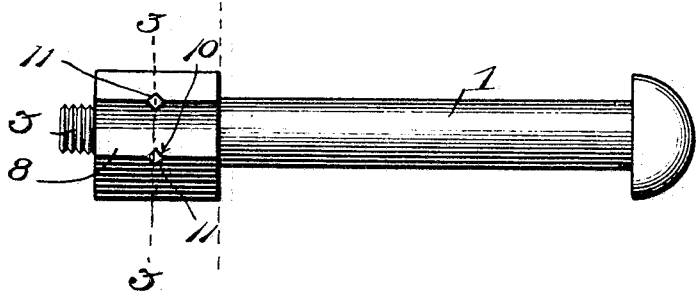
Fig 4.
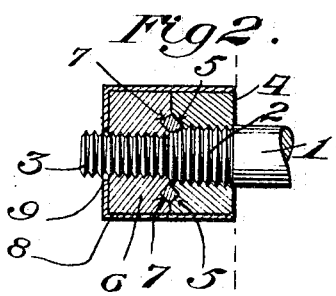
Fig 2.
Fig 3.
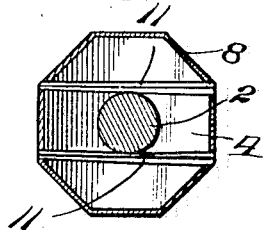
Inventor
Thomas W. Steele
Witnesses
Phil E. Barnes
Herbert D. Lawson
By Victor J. Evans
Attorney No. 782,079.  Patented February 7, 1905.

UNITED STATES PATENT OFFICE.

THOMAS W. STEELE, OF LANGSVILLE, OHIO.

NUT-LOCK.

SPECIFICATION forming part of Letters Patent No. 782,079, dated February 7, 1905.

Application filed August 5, 1904. Serial No. 219,680.

*To all whom it may concern:*

Be it known that I, THOMAS W. STEELE, a citizen of the United States, residing at Langsville, in the county of Meigs and State of Ohio, have invented new and useful Improvements in Nut-Locks, of which the following is a specification.

My invention relates to new and useful improvements in nut-locks; and its object is to provide a device of this character whereby nuts may be securely held upon bolts and at the same time be protected from the action of the elements.

The invention consists of a bolt having a threaded portion at one end from which projects a stem which is screw-threaded in a direction opposite to that of the body of the bolt. Two nuts are employed, one of which engages the thread on the bolt, while the other is adapted to be turned in the opposite direction and engage the threads on the stem. The two nuts have grooves in their adjoining faces which are adapted to register when the nuts contact. A cap is then placed over the nuts to protect them from the action of the elements, and pins are inserted into the grooves and serve to lock the two nuts securely together and at the same time prevent the removal of the cap.

The invention also consists of the further novel construction and combination of parts hereinafter more fully described and claimed, and illustrated in the accompanying drawings, showing the preferred form of my invention, in which—

Figure 1 is a side elevation of a bolt having my improved nut-lock thereon. Fig. 2 is a central longitudinal section through the nuts on the bolt. Fig. 3 is an enlarged section on line 3 3, Fig. 1; and Fig. 4 is a detail view of one of the pins.

Referring to the figures by numerals of reference, 1 is a bolt of any suitable construction having a screw-threaded end 2, from which projects a threaded stem 3, which is of less diameter than the bolt and the threads on which are pitched in a direction opposite to those on the bolt 1. A nut 4 is adapted to be screwed upon the threaded end 2 of the bolt and has parallel grooves 5 in opposite faces thereof and which extend across one face of the nut at opposite sides of the bolt-hole therein. A nut 6, similar to the nut 4, is adapted to be screwed upon the stem 3, and this nut 6 also has grooves 7 in one face which are similar to the grooves 5 and which are adapted to register with said grooves 5 when the two nuts contact. A cap 8 of any suitable construction and having a central aperture 9 in one end is adapted to be placed over the two nuts with the stem 3 projecting through the aperture 9, and this cap serves to protect the nuts from the action of the elements. Openings 10 are formed in the opposite sides of the cap and are adapted to register with the grooves 5 and 7, and these apertures, as well as the grooves, receive pins 11, which securely bind the two nuts against independent movement and at the same time hold the cap 8 in position.

It will be seen that this nut-lock is very simple and compact in construction and neat in apearance, and when the parts are once placed in the positions described and shown it is absolutely impossible to remove the nuts, as independent movement of the nuts in opposite directions is not permitted. Further, it may be observed that the pins 11 may be dispensed with and any other appropriate means provided for securing the cap in position, inasmuch as the cap will obviously serve not only as a protection for the nuts, but also as a means of preventing their reverse rotation upon the threaded parts of the bolt.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. The combination with a screw-threaded bolt having an oppositely-screw-threaded stem of less diameter than the bolt; of a nut mounted upon the threaded portion of the bolt and having a groove in one face thereof, a second nut mounted upon the stem and having a groove in one face thereof adapted to register with the groove in the first-mentioned nut, a cap extending over the nuts, and a pin engaging the cap and projecting through the grooves.

2. The combination with a bolt having a screw-threaded portion, and an oppositely-screw-threaded stem extending therefrom of less diameter than the screw-threaded portion; of a nut mounted upon the threaded portion of the bolt and having parallel grooves in one face thereof and at opposite sides of the bolt, a second nut mounted upon the stem and having grooves adapted to register with the first-mentioned grooves when the nuts contact, a cap inclosing and engaging the nuts, and pins extending through apertures in the cap and through the grooves in the nuts.

In testimony whereof I affix my signature in presence of two witnesses.

THOMAS W. STEELE.

Witnesses:
J. R. KYLE,
C. E. MURDOCK.